(12) United States Patent
Courcier et al.

(10) Patent No.: US 10,670,210 B2
(45) Date of Patent: Jun. 2, 2020

(54) SYSTEM OF LENSES FOR PROJECTING AT LEAST ONE LIGHT SOURCE

(71) Applicant: VALEO VISION, Bobigny (FR)

(72) Inventors: Marine Courcier, Bobigny (FR); Jerome Lecorre, Bobigny (FR)

(73) Assignee: VALEO VISION, Bobigny (FR)

( * ) Notice: Subject to any disclaimer, the term of this patent is extended or adjusted under 35 U.S.C. 154(b) by 172 days.

(21) Appl. No.: 15/433,284

(22) Filed: Feb. 15, 2017

(65) Prior Publication Data

US 2017/0234497 A1 Aug. 17, 2017

(30) Foreign Application Priority Data

Feb. 16, 2016 (FR) ...................................... 16 51225

(51) Int. Cl.
| | |
|---|---|
| *F21S 41/143* | (2018.01) |
| *G02B 13/00* | (2006.01) |
| *F21S 41/255* | (2018.01) |
| *F21S 41/25* | (2018.01) |
| *F21Y 115/10* | (2016.01) |
| *F21K 9/64* | (2016.01) |
| *F21S 41/663* | (2018.01) |

(52) U.S. Cl.
CPC .............. *F21S 41/143* (2018.01); *F21K 9/64* (2016.08); *F21S 41/25* (2018.01); *F21S 41/255* (2018.01); *G02B 13/002* (2013.01); *F21S 41/663* (2018.01); *F21Y 2115/10* (2016.08)

(58) Field of Classification Search
CPC ...... F21S 41/143; F21S 41/151; F21S 41/153; F21S 41/16; F21S 41/20; F21S 41/24; F21S 41/285; F21S 41/27; F21S 41/663; F21S 41/25; F21S 41/255; F21S 41/275; F21Y 2115/10; G02B 13/002; G02B 3/02; G02B 3/024; G02B 3/04; G02B 19/0066; G02B 19/0061; G02B 19/0052; G02B 19/0057; F21V 5/008; F21V 5/04; F21V 5/048; B60Q 2300/42; F21K 9/64
See application file for complete search history.

(56) References Cited

U.S. PATENT DOCUMENTS

| | | | |
|---|---|---|---|
| 6,337,873 B1 * | 1/2002 | Goering | G02B 27/09 359/618 |
| 9,739,450 B2 * | 8/2017 | Oka | F21V 13/12 |
| 2005/0174771 A1 * | 8/2005 | Conner | G02B 27/0961 362/244 |

(Continued)

*Primary Examiner* — Erin Kryukova
(74) *Attorney, Agent, or Firm* — Oblon, McClelland, Maier & Neustadt, L.L.P.

(57) ABSTRACT

A system of lenses for projecting at least one light source includes from the source and in the direction of propagation of the light, at least one first group of optical elements made up of at least one first convergent lens called primary lens, in contact with said light source, obtained from a material exhibiting a high constringence and exhibiting a ratio between its thickness along the optical axis and its width greater than 0.5. Also included in said direction of propagation is a second group of optical elements made up of at least one divergent lens obtained from a material exhibiting a low constringence, a pupil, and a third group of optical elements made up of a reflector or of at least one convergent lens obtained from a material exhibiting a high constringence.

18 Claims, 2 Drawing Sheets

(56) References Cited

U.S. PATENT DOCUMENTS

| | | | |
|---|---|---|---|
| 2008/0129964 A1* | 6/2008 | Alasaarela | G02B 27/0911 353/81 |
| 2009/0161360 A1* | 6/2009 | Li | F21V 5/048 362/235 |
| 2010/0195335 A1* | 8/2010 | Allen | F21V 5/048 362/309 |
| 2011/0122598 A1* | 5/2011 | Chang | F21V 5/008 362/33 |
| 2012/0163009 A1* | 6/2012 | Nakazato | F21S 41/16 362/510 |
| 2012/0287621 A1* | 11/2012 | Lee | F21V 5/002 362/231 |
| 2015/0131305 A1* | 5/2015 | Courcier | F21S 41/141 362/516 |
| 2015/0167924 A1* | 6/2015 | Uchida | G02B 19/0014 362/311.09 |
| 2015/0369437 A1* | 12/2015 | Reinprecht | F21S 41/16 362/510 |
| 2016/0109074 A1* | 4/2016 | Hirasawa | F21K 9/64 362/511 |
| 2016/0178154 A1* | 6/2016 | Sapt | G02B 19/0019 362/521 |
| 2016/0281947 A1* | 9/2016 | Shim | F21S 41/255 |
| 2017/0177964 A1* | 6/2017 | Wu | G02B 27/144 |
| 2017/0210280 A1* | 7/2017 | Suzuki | B60Q 1/1423 |
| 2018/0059523 A1* | 3/2018 | Takagi | G03B 21/208 |
| 2018/0156409 A1* | 6/2018 | Schwaiger | H01S 5/005 |

* cited by examiner

SYSTEM OF LENSES FOR PROJECTING AT LEAST ONE LIGHT SOURCE

The present invention relates to a system of lenses for projecting at least one light source, such as a scan laser or a light-emitting diode called LED said to be immersed in a first lens called primary lens. The invention will have many applications in the field of lighting and more particularly in the field of the lighting and/or signaling systems for motor vehicles.

In the lighting field, and in particular in the field of motor vehicles, different types of bulbs have been used as light source but, recently, light-emitting diodes (LED) are being increasingly widely used. This is because light-emitting diodes (LED) have an excellent efficiency in converting electricity into light, emit a low quantity of heat, have a reduced size and weight and a long life.

Given these advantages, many lighting systems have been designed by using arrays of LEDs positioned directly in line with a lens, generally an aspherical lens which makes it possible to correct aberrations. Moreover, it is standard practice to calculate the form of the surfaces of the diopters of the lighting systems in order, on the one hand, to limit the aberrations induced by said diopters that the light passes through and, on the other hand, to obtain the desired light beam at the output. Although it is possible to obtain a good imaging for an LED situated on the optical axis of the lighting system, the lighting systems comprise a large number of LEDs, and consequently LEDs that are away from the optical axis, which cause nuisance field aberrations.

The invention proposes to improve the situation and to that end relates to a system of lenses for projecting at least one light source comprising, from said source and in the direction of propagation of the light, at least one first group of optical elements made up of at least one first convergent lens, called primary lens, of hemispherical form, in contact with said light source, obtained from a material exhibiting a high constringence and exhibiting a ratio between its thickness along the optical axis and its width greater than 0.5, a second group of optical elements made up of at least one divergent lens obtained from a material exhibiting a low constringence, a pupil and a third group of optical elements made up of at least one convergent reflector or of at least one convergent lens obtained from a material exhibiting a high constringence.

The primary optic of hemispherical form makes it possible to pick a maximum of light from the light source and the lenses of the three optical systems, successively convergent, divergent and convergent, make it possible to correct the aberrations and form the light beam.

In order for the light picked up by the primary optic to be as much as possible, the first, hemispherical primary convergent lens exhibits a discrepancy to a sphere less than 10% of the thickness and, preferably, a discrepancy to a sphere less than 3% of the thickness.

Preferably, the first group of optical elements comprises a second lens comprising at least one aspherical face, the aspherical face of the second lens of the first group of optical elements extending on the side opposite the primary lens.

Moreover, the divergent lens of the second group of optical elements preferably consists of a biconcave lens.

Alternatively, the divergent lens of the second group of optical elements consists of a plano-concave lens (FIG. 3).

Preferably, the convergent lens of the third group of optical elements comprises at least one aspherical face, the aspherical face of the convergent lens of the third group of optical elements extending on the side opposite the pupil positioned between the second group of optical elements and the third group of optical elements.

Preferably, the light source consists of at least one LED source or a laser.

According to one aspect of the invention, the light source consists of a wavelength conversion device in contact with the primary convergent lens and receiving the radiation from a primary source made up of a plurality of LED sources.

Preferably, the wavelength conversion device is made up of a substrate comprising at least two materials respectively forming an interferential filter and distributed in at least two different zones.

The invention will be better understood in light of the following description which is given purely by way of indication and which is not intended to limit it, accompanied by the attached drawings in which.

In the figures, the elements that are identical or similar bear the same references.

Figure 1:
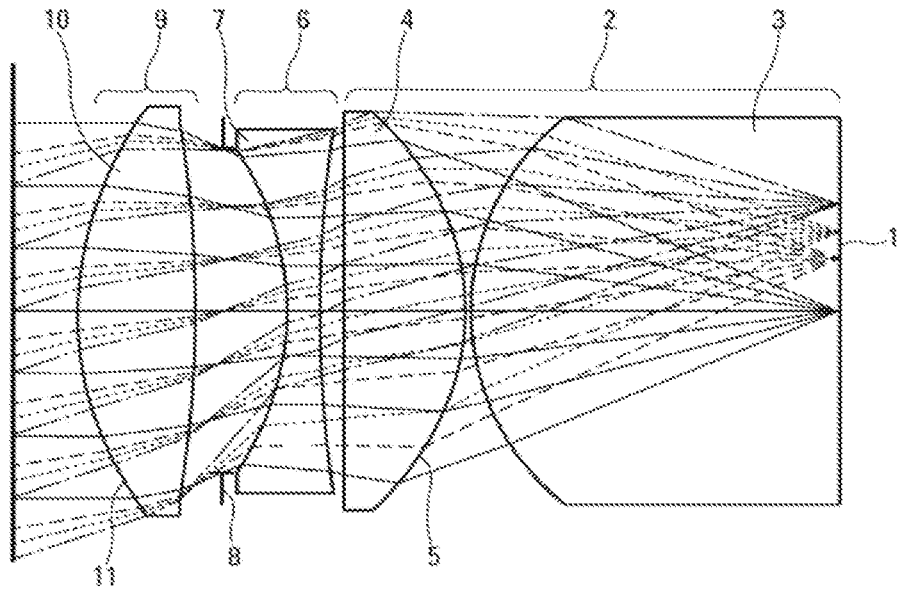
FIG. 1 is a schematic representation of the system of lenses for projecting at least one light source according to the invention.

As illustrated in FIG. 1, the invention relates to a system of lenses for projecting at least one light source 1. Said system of lenses comprises, from said light source 1 and in the direction of propagation of the light, a first group of optical elements 2 made up of a first convergent lens 3 called primary lens of hemispherical form, in contact with said light source 1, obtained from a material exhibiting a high constringence and exhibiting a ratio between its thickness along the optical axis and its height greater than 0.5, and a second lens 4 comprising an aspherical face 5, the aspherical diopter 5 of the second lens 4 of the first group of optical elements 2 corresponding to the input diopter of the lens, i.e. extending on the side of the primary lens 4, a second group of optical elements 6 made up of a divergent lens 7 obtained from a material exhibiting a low constringence, a pupil 8 and a third group of optical elements 9 made up of a convergent lens 10 obtained from a material exhibiting a high constringence. Hereinafter in the description, "high constringence" will be understood to mean a constringence greater than 40 and "low constringence" will be understood to mean a constringence less than 40.

It will be seen that the light source 1 will be able to consist of any primary light source or any secondary light source such as an output, or decoupling, zone of light guides, an output, or decoupling, zone of a matrix of convergent diopters, or a virtual image (in the material) generated by a matrix of convergent diopters without in any way departing from the scope of the invention.

For example, the primary lens 3 of the first group of optical elements 2 and the convergent lens 10 of the third group of optical elements 9 will be able to be obtained from an optical glass marketed under the reference N-LAK33A by the company SCHOTT and the constringence of which is equal to 52, in polymethyl methacrylate, commonly referred to by the acronym PMMA and the constrigence of which is equal to 58 or from any other transparent thermoplastic polymer having the same constringence. The divergent lens 6 of the second group of optical elements 6 will be able to be obtained from any material exhibiting a constringence less than 40 such as polycarbonate (PC), the constringence of which is 30, or glass N-SF2, the constringence of which is 339 for example.

The primary lens 3 of hemispherical form makes it possible to extract a maximum of light from the light source 1 and the lenses 3, 4, 7 and 10 of the three optical systems 2, 6 and 9, successively convergent, divergent and convergent, make it possible to correct the aberrations and form the light beam. It will be noted that "constringence" should be understood to mean the index representative of the chromatic dispersion of the lenses. Thus, the constringence is equivalent to the Abbe number and to the dispersion coefficient and corresponds to the refractive index variation of the material as a function of the wavelength of the light. The higher the constringence, the lower the chromatic dispersion of the lens.

In order to obtain both the best extraction of the light and the best correction of the optical aberrations, the hemispherical primary convergent lens 3 exhibits a discrepancy to a sphere less than 10% of the thickness of the lens and, preferably, a discrepancy to a sphere less than 3% of the thickness.

Moreover, the divergent lens 6 of the second group of optical elements consists of a biconcave lens in which the input diopter of the lens has a radius of curvature greater than the radius of curvature of the output diopter. Furthermore, the convergent lens 10 of the third group of optical elements comprises an aspherical diopter 11, said aspherical diopter 11 of the convergent lens 10 of the third group of optical elements 9 extending on the side opposite the pupil 8 positioned between the second group of optical elements 6 and the third group of optical elements 9, i.e. corresponding to the output diopter of said convergent lens 10. It will be noted also that the optical axes of the lenses 3, 4, 6 and 10 are coaxial.

In this exemplary embodiment, the light source 1 consists of light-emitting diodes, called LEDs, in which the phosphor is said to be immersed in the primary lens 3. "Immersed" should be understood to mean the fact that the phosphor of the LEDs is in contact with the primary lens 3. In this way, the light emitted by the phosphor leaves directly "immersed" in the primary optic. However, obviously the light source will be able to consist of any light source well known to those skilled in the art without in any way departing from the scope of the invention.

According to a first variant execution, not represented in the figures, the first group of optical elements 2 will be able to comprise just a single hemispherical primary convergent lens 3.

According to another variant execution, not represented in the figures, the convergent lens 10 of the third group of optical elements 9 will be able to be replaced by one or more convergent reflectors.

Moreover, it goes without saying that each of the lenses 3, 5, 7 and 10 will be able to be replaced by at least two lenses without in any way departing from the scope of the invention.

Figure 2:
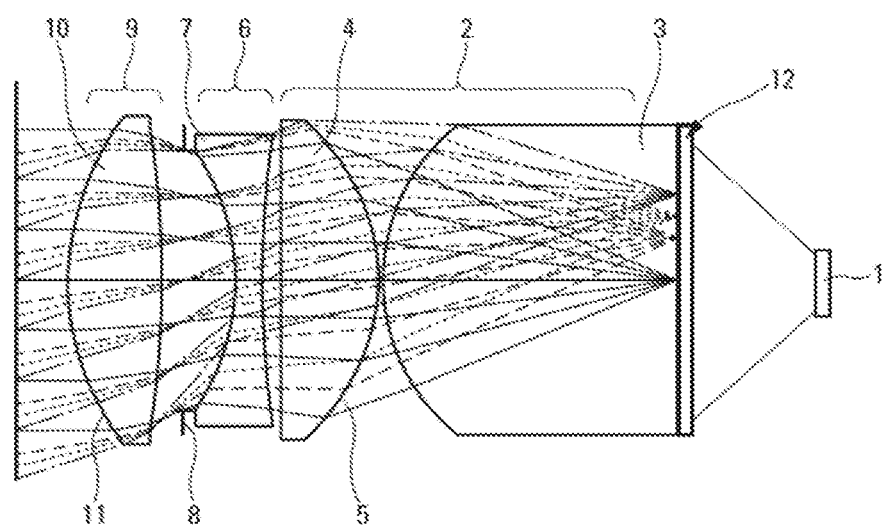
FIG. 2 is a representation of a variant execution of the system of projection lenses according to the invention, said variant execution comprising a wavelength conversion device.
Figure 3:
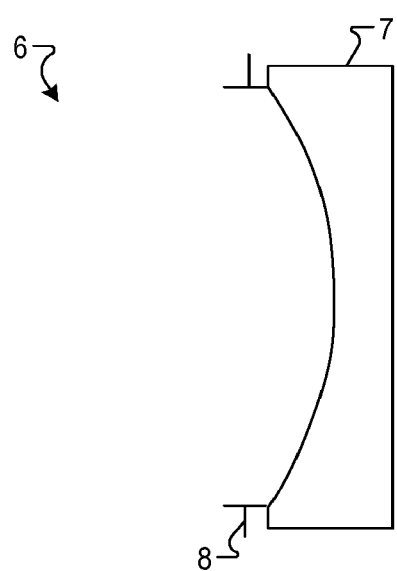
FIG. 3 is a representation of the divergent lens of the second group of optical elements.

According to another variant execution referring to FIG. 2, said system of lenses comprises, in the same way as previously, from said light source 1 and in the direction of propagation of the light, a first group of optical elements 2 made up of a first convergent lens 3 called primary lens of hemispherical form, in contact with said light source 1, obtained from a material exhibiting a high constringence and exhibiting a ratio between its thickness along the optical axis and its width greater than 0.5, and a second lens 4 comprising an aspherical face 5, the aspherical diopter 5 of the second lens 4 of the first group of optical elements 2 corresponding to the input diopter of the lens, i.e. extending on the side of the primary lens 4, a second group of optical elements 6 made up of a divergent lens 7 obtained from a material exhibiting a low constringence, a pupil 8 and a third group of optical elements 9 made up of a convergent lens 10 obtained from a material exhibiting a high constringence.

Said system of lenses differs from the one described previously by the fact that it comprises a wavelength conversion device 12 in contact with the primary convergent lens 3 and receiving the radiation from a primary light source 1 made up of a plurality of light-emitting diodes called LED. Thus, the wavelength conversion device behaves like an immersed secondary light source, i.e. a secondary light source in contact with the primary convergent lens 3.

It will be observed that the plurality of light-emitting diodes will be able to be replaced by a single LED made up of individually addressable zones or by a zone for formation of an image by laser beam scanning, said zone comprising a diffusing and/or reflecting surface, without in any way departing from the scope of the invention.

Thus, the lighting system according to the invention is capable of projecting, in light beam form, an image of the light source placed at the focus of the optical system, that is to say in contact with the hemispherical primary lens 3. More particularly, said light source 1 can be a matrix of LEDs, that is to say a light surface subdivided into zones, such as squares, commonly called "pixels" for example, which can be switched on or switched off independently of one another in order to produce a so-called adaptive lighting system. Such an adaptive lighting system of a vehicle makes it possible to adapt the distribution of the light of the beam to the traffic conditions. For example, when all the pixels are on, the system projects onto the road a powerful light beam, commonly called high beam, which is dazzling for other drivers, and, when a vehicle is detected in front of the lighting system, the pixel or pixels whose light dazzles the other driver are off in the beam to form a less powerful beam, commonly called low beam.

It is clearly understood that the present invention is in no way limited to the embodiments described above and that many modifications can be made thereto without departing from the scope of the attached claims.

The invention claimed is:

1. A system of lenses for a vehicle lighting system for projecting light from a light source comprising, ordered from said light source and in the direction of propagation of the light,
   at least one first group of optical elements including
      a first convergent lens, the first convergent lens being in contact with said light source, formed from a material exhibiting a high constringence and exhibiting a ratio between a thickness along an optical axis of the first convergent lens and a width of the at least one first convergent lens in a direction perpendicular to the optical axis of greater than 0.5 and
      a second lens having at least one aspherical face, the at least one aspherical face corresponding to an entry face;
   a second group of optical elements including a divergent lens formed from a material exhibiting a low constringence;
   a pupil; and
   a third group of optical elements made up of at least one convergent lens formed from a material exhibiting a high constringence, wherein the light source includes a wavelength conversion device, the wavelength conversion device being in contact with the first convergent lens.

2. The system of lenses according to claim 1, wherein the first convergent lens is of hemispherical form and exhibits a discrepancy to a sphere less than 10% of the thickness.

3. The system of lenses according to claim 1, wherein the at least one aspherical face of the second lens of the first group of optical elements extends on the side of the first convergent lens.

4. The system of lenses according to claim 1, wherein the divergent lens of the second group of optical elements consists of a biconcave lens.

5. The system of lenses according to claim 1, wherein the divergent lens of the second group of optical elements is a plano-concave lens.

6. The system of lenses according to claim 1, wherein the at least one convergent lens of the third group of optical elements includes at least one aspherical face corresponding to an exit face of the at least one convergent lens.

7. The system of lenses according to claim 6, wherein the at least one aspherical face of the at least one convergent lens of the third group of optical elements extends on the side opposite the pupil positioned between the second group of optical elements and the third group of optical elements.

8. The system of lenses according to claim 1, wherein the light source includes one LED source or a laser.

9. The system of lenses according to claim 1, wherein the first convergent lens has a constringence greater than 40 and the at least one convergent lens exhibits a constringence greater than 40.

10. The system of lenses according to claim 1, wherein the vehicle lighting system is an adaptive lighting system.

11. A vehicle lamp comprising:
a light source projecting light; and
a system of lenses including, ordered from the light source and in the direction of propagation of the light,
at least one first group of optical elements including
a first convergent lens, the first convergent lens being in contact with said light source, formed from a material exhibiting a high constringence and exhibiting a ratio between a thickness along an optical axis of the first convergent lens and a width of the at least one first convergent lens in a direction perpendicular to the optical axis of greater than 0.5 and
a second lens having at least one aspherical face, the at least one aspherical face corresponding to an entry face,
a divergent lens formed from a material exhibiting a low constringence,
a pupil, and
a convergent lens formed from a material exhibiting a high constringence, wherein the light source includes a wavelength conversion device, the wavelength conversion device being in contact with the first convergent lens.

12. The vehicle lamp according to claim 11, wherein the first convergent lens is of hemispherical form and exhibits a discrepancy to a sphere less than 10% of the thickness.

13. The vehicle lamp according to claim 11, wherein the at least one aspherical face of the second lens of the first group of optical elements extends on the side of the first convergent lens.

14. The vehicle lamp according to claim 11, wherein the divergent lens consists of a biconcave lens.

15. The vehicle lamp according to claim 11, wherein the divergent lens is a plano-concave lens.

16. The vehicle lamp according to claim 11, wherein the at least one convergent lens includes at least one aspherical face corresponding to an exit face of the at least one convergent lens.

17. The vehicle lamp according to claim 16, wherein the at least one aspherical face of the at least one convergent lens extends on the side opposite the pupil positioned between the divergent lens and the at least one convergent lens.

18. The vehicle lamp according to claim 11, wherein the light source includes one LED source or a laser.

* * * * *